US006663532B1

(12) United States Patent
McIndoe et al.

(10) Patent No.: US 6,663,532 B1
(45) Date of Patent: Dec. 16, 2003

(54) DUAL STRATEGY CONTROL FOR A TOROIDAL DRIVE TYPE CONTINUOUSLY VARIABLE TRANSMISSION

(75) Inventors: Gordon M. McIndoe, Perrysburg, OH (US); Charles B. Lohr, Maumee, OH (US); John M. Loeffler, Whitehouse, OH (US)

(73) Assignee: Transmisiones TSP, S. A., DE, C.V., Escobedo (MX)

( * ) Notice: Subject to any disclaimer, the term of this patent is extended or adjusted under 35 U.S.C. 154(b) by 66 days.

(21) Appl. No.: 09/666,745

(22) Filed: Sep. 20, 2000

Related U.S. Application Data
(60) Provisional application No. 60/154,876, filed on Sep. 20, 1999.

(51) Int. Cl.[7] ................................................. B06K 41/12
(52) U.S. Cl. .......................................................... 477/43
(58) Field of Search ............................ 477/37, 41, 43; 475/214–219, 208, 209, 115

(56) References Cited

U.S. PATENT DOCUMENTS

| 4,481,844 A | 11/1984 | Ironside et al. | |
|---|---|---|---|
| 4,893,526 A | 1/1990 | Tokoro | |
| 4,974,466 A | 12/1990 | Kraus et al. | |
| 4,996,891 A | 3/1991 | Kraus et al. | |
| 5,330,396 A | 7/1994 | Lohr et al. | |
| 5,413,540 A | 5/1995 | Streib et al. | |
| 5,417,620 A | 5/1995 | Lohr et al. | |
| 5,521,819 A | 5/1996 | Greenwood | |
| 5,540,631 A | 7/1996 | Lohr, III et al. | |
| 5,575,737 A | * 11/1996 | Weiss ........................... | 477/43 |
| 5,607,372 A | 3/1997 | Lohr | |
| 5,766,105 A | 6/1998 | Fellows et al. | |
| 5,807,206 A | 9/1998 | Okazaki | |
| 5,857,161 A | 1/1999 | Zeilinger et al. | |
| 6,063,002 A | * 5/2000 | Nobumoto et al. ........... | 477/41 |
| 6,066,070 A | * 5/2000 | Ito et al. ....................... | 477/43 |
| 6,076,031 A | 6/2000 | Takizawa et al. | |
| 6,135,917 A | 10/2000 | Takizawa et al. | |
| 6,148,257 A | * 11/2000 | Katakura et al. .......... | 477/43 X |
| 6,151,542 A | * 11/2000 | Yoshino et al. ........... | 477/43 X |
| 6,181,020 B1 | 1/2001 | Uchida et al. | |
| 6,312,357 B1 | * 11/2001 | Sakai et al. .................... | 477/37 |

FOREIGN PATENT DOCUMENTS

| EP | 281849 | 9/1988 |
| EP | 347186 | 12/1989 |
| EP | 905413 | 3/1999 |
| EP | 937913 | 8/1999 |
| EP | 1010920 | 6/2000 |
| JP | 361055448 | 3/1986 |
| JP | 362289440 | 12/1987 |
| JP | 06316232 | 11/1994 |
| JP | 11037241 | 2/1999 |

* cited by examiner

*Primary Examiner*—Roger Pang
(74) *Attorney, Agent, or Firm*—MacMillan, Sobanski & Todd, LLC (57) ABSTRACT

An apparatus and method for operating a continuously variable transmission (CVT), such as a toroidal drive type transmission, is disclosed. The CVT is selectively operated in either a torque control strategy and a ratio control strategy, depending upon the operating conditions of the vehicle. Thus, the CVT is operated in such a manner as to benefit from the advantageous aspects of both the torque and ratio control strategies, while avoiding the disadvantageous aspects of both strategies. The transition from the torque control strategy to the ratio control strategy (and vice versa) can be accomplished by simultaneously calculating the control pressures that would result from operation in both the torque and ratio control strategies, and further assigning a weighted value to each of such calculated control pressures based upon the current operating conditions. The summation of such weighted values provides a composite control signal that facilitates a smooth transition between the two control strategies. The transition from the torque control strategy to the ratio control strategy preferably occurs before a mode shift is effected. Negative feedback is provided in response to ratio changes effected by the control signals to increase stability and to compensate for sensitivity differences at different ratio angles, loading, speeds, and temperatures.

5 Claims, 9 Drawing Sheets

DUAL STRATEGY CONTROL FOR A TOROIDAL DRIVE TYPE CONTINUOUSLY VARIABLE TRANSMISSION

CROSS REFERENCE TO RELATED APPLICATION

This application claims the benefit of U.S. Provisional Application No. 60/154,876, filed Sep. 20, 1999, the disclosure of which is incorporated herein by reference.

BACKGROUND OF THE INVENTION

This invention relates in general to toroidal drive type continuously variable transmissions such as for use in vehicles. In particular, this invention relates to an improved apparatus and method for operating such a toroidal drive type continuously variable transmission.

In virtually all land vehicles in use today, a transmission is provided in a drive train between a source of rotational power, such as an internal combustion or diesel engine, and the driven axle and wheels of the vehicle. One common type of transmission is a discretely geared transmission, which includes a case containing an input shaft, an output shaft, and a plurality of meshing gears. Means are provided for connecting selected ones of the meshing gears between the input shaft and the output shaft to provide a desired gear ratio therebetween. The meshing gears contained within the transmission case are of varying size so as to provide a plurality of such discrete gear ratios between the input shaft and the output shaft. By appropriately shifting among these various discrete gear ratios, acceleration and deceleration of the vehicle can be accomplished in a relatively smooth and efficient manner.

Another type of such transmission is a continuously variable transmission (CVT), wherein the ratio between the input shaft and the output shaft is not provided in discrete gear increments, as described above in connection with the discretely geared transmission, but rather is adjustable in a continuous or infinitely variable manner over a predetermined range. One known structure for a continuously variable transmission includes a forwardly positioned continuously variable drive section that is connected through an intermediate co-axial drive section to a rearwardly positioned output gear section. A representative structure for such a CVT is disclosed in U.S. Pat. No. 5,607,372. An electromechanical control system is often provided for controlling the operation of the CVT in a desired manner.

Traditionally, such a control system has been programmed to operate the CVT in either the torque control strategy or the ratio control strategy. When the CVT is operated in the torque control strategy, the control system correlates the throttle pedal position of the engine (as set by the driver of the vehicle using the accelerator pedal) with a desired amount of thrust for the vehicle. When the CVT is operated in the ratio control strategy, the control system controls the input speed of the CVT to a predetermined value that represents some ideal operating parameters for the engine at the current conditions. Although both of these control strategies have been effective, it has been found that both of such control strategies have disadvantages under certain operating conditions. Thus, it would be desirable to provide an improved control strategy for a CVT that achieves the advantages of both of such control strategies, while avoiding the disadvantages associated therewith.

SUMMARY OF THE INVENTION

This invention relates to an improved apparatus and method for operating a toroidal drive type continuously variable transmission (CVT). The CVT is selectively operated in either a torque control strategy and a ratio control strategy, depending upon the operating conditions of the vehicle. Thus, the CVT is operated in such a manner as to benefit from the advantageous aspects of both the torque and ratio control strategies, while avoiding the disadvantageous aspects of both strategies. The transition from the torque control strategy to the ratio control strategy (and vice versa) can be accomplished by simultaneously calculating the control valve signals that would result from operation in both the torque and ratio control strategies, and further assigning a weighted value to each of such calculated control valve signals based upon the current operating conditions. The summation of such weighted values provides a composite control signal that facilitates a smooth transition between the two control strategies. The transition from the torque control strategy to the ratio control strategy preferably occurs before a mode shift is effected. Negative feedback is provided in response to ratio changes effected by the control signals to increase stability and to compensate for sensitivity differences at different ratio angles, loading, speeds, and temperatures.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

1. CVT Structure

Figure 1:
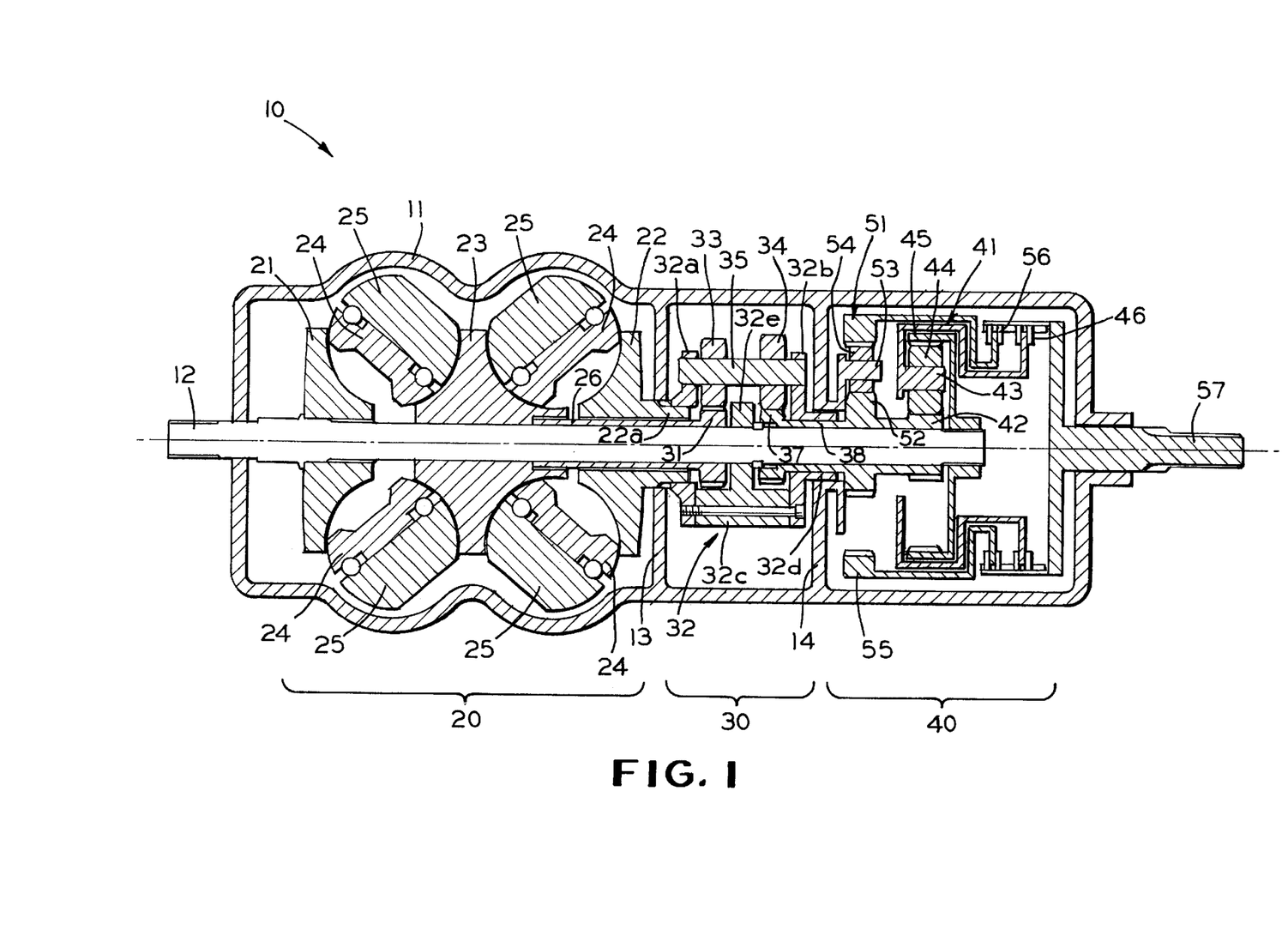
FIG. 1 is a schematic top plan view of a toroidal drive type continuously variable transmission in accordance with this invention.

Referring now to the drawings, there is schematically illustrated in FIG. 1 a portion of a toroidal drive type continuously variable transmission (CVT), indicated generally at 10, in accordance with this invention. Although this invention will be described in the context of the illustrated structure for the CVT 10, it will be appreciated that this invention may be used in conjunction with other CVT structures. Therefore, the scope of this invention is intended to be limited only by the claims appended hereto. The general structure and operation of the illustrated CVT 10 are known in the art, and only those portions of the CVT 10 that are necessary for a complete understanding of this invention are illustrated. A complete discussion of the structure and operation of the illustrated CVT 10 can be found in U.S. Pat. No. 5,607,372, the disclosure of which is incorporated herein by reference.

The illustrated CVT 10 is an infinitely variable and regenerative transmission that includes a forwardly positioned continuously variable drive section, indicated generally at 20, that is connected through an intermediate co-axial drive section, indicated generally at 30, to a rearwardly positioned output gear section, indicated generally at 40. For purposes of clarification, the terms front or forward refer to the left side of the CVT 10 shown in FIG. 1, while the terms rear or rearward refer to the right side thereof. All three of the sections 20, 30, and 40 are enclosed within a housing 11 and are driven off of an input drive shaft 12 that is rotatably driven by an engine (not shown). The housing 11 is divided by forward and rearward internal walls 13 and 14, respectively, into three chambers, one for each of the sections 20, 30, and 40 of the exemplary CVT 10.

The illustrated continuously variable drive section 20 is a dual cavity toroidal type, including first and second outboard traction disks 21 and 22 and a single integral inboard disk 23, all of which are disposed concentrically about the input shaft 18. A forward toric cavity is defined between the front outboard disk 21 and the inboard disk 23, while a rearward toric cavity is defined between the inboard disk 23 and the rear outboard disk 22. First and second traction rollers 24 are disposed in each of the toric cavities. The rollers 24 are preferably disposed transversely on opposites sides of each toric cavity. Each pair of the traction rollers 24 is engaged between the associated one of the outboard disks 21 and 22 and the inboard disk 23. The rollers 24 are supported on respective trunnions 25 in such a manner as to be movable relative to the outboard disks 21 and 22 and the inboard disk 23 to initiate a change in the transmission ratio. The mechanism for effecting such relative movement of the trunnions 25 and, therefore, the rollers 24 will be described below.

The front outboard disk 21 can be splined directly onto the input shaft 12 for rotation therewith. The rear outboard disk 22 is connected for rotation with the input shaft 12 in the manner described below. The rear end of the rear outboard disk 22 has a hollow cylindrical collar portion 22a that extends through an axial opening formed through the forward internal wall 13 into the middle chamber of the housing 11 containing the co-axial drive section 30. The cylindrical collar portion 22a and the rear outboard disk 22 are supported for rotation within this axial opening by an annular bearing (not shown) provided therein. The inboard disk 23 is supported on the input shaft 12 by bearings (not shown) so as to be rotatable relative thereto. The rearward end of the inboard disk 23 is splined for rotation with a first torque tube 26, which is disposed concentrically about the input shaft 12. The torque tube 26 extends concentrically through an opening formed though the rear outboard disk 22 and further through the axial opening formed through the front internal wall 13 into the middle chamber of the housing 11 containing the co-axial drive section 30.

The illustrated continuously variable drive section 20 of the CVT 10 is a dual cavity, half toroidal (or "off-center") type continuously variable drive, wherein the included angle between the traction contacts (i.e., where the traction rollers 24 contact the disks 21, 22, and 23) is less than one hundred eighty degrees. Notwithstanding this, it will be appreciated that this invention may be practiced with other structures for the continuously variable drive section 20. For example, the continuously variable drive section 20 may be formed having only a single toroidal cavity if desired. Alternatively, the continuously variable drive section 20 may be a full toroidal (or "on-center") type continuously variable drive, wherein the included angle between the traction contacts is approximately equal to one hundred eighty degrees.

The illustrated co-axial drive section 30 is a planetary type drive, although such is not required. It will be understood that the structure of the co-axial drive section 30 can be varied in a number of ways, including being an epicyclic (as shown) or other conventional planetary gear assembly or planetary traction drive. A first sun gear 31 is formed integrally with the rearward end of the torque tube 26. The co-axial drive section 30 also includes a planetary carrier, indicated generally at 32, for carrying a plurality of pairs of axially joined first and second planet gears 33 and 34 around the input shaft 12. Preferably, each pair of compound planet gears 33 and 34 is of one-piece construction. The illustrated epicyclic planetary-co-axial drive section 30 does not include a ring gear, as is typically present in conventional planetary gear assemblies.

The illustrated planetary carrier 32 is formed from three components, namely, a front support member 32a, a rear support member 32b, and a central member 32c extending therebetween. The front support member 32a is disposed concentrically about and is splined for rotation with the rearwardly extending collar portion 22a of the second outboard disk 22. The rear support member 32b has a rearwardly extending, hollow cylindrical support portion 32d formed thereon that extends through an axial opening formed through the rearward internal wall 14 into the rear chamber of the housing 11 containing the output gear section 40. A plurality of bearing pins 35 (only one is illustrated) extends between and is secured to the front support member 32a and the rear support member 32b. Preferably, the bearing pins 35 are equally spaced about the planetary carrier 32 and the input shaft 12. The central member 32c of the planetary carrier 32 includes a hub portion 32e that is splined onto the input shaft 18 for rotation therewith.

Each pair of planet gears 33 and 34 is mounted on one of the bearing pins 35 for rotation relative thereto. The forward planet gears 33 mesh with the input sun gear 31 provided on the rear end of the torque tube 26, while the rearward planet gears 34 mesh with a second sun gear 37 provided in the co-axial drive section 30. The second sun gear 37 is smaller than the first sun gear 31 and is splined for rotation with the forward end of a second torque tube 38. The rearward end of second tube 38 extends co-axially through the rearwardly extending, hollow cylindrical support portion 32d of the planetary carrier 32 and through the axial opening formed through the rearward internal wall 14 into the rear chamber of the housing 11 containing the output gear section 40.

Within the rear chamber of the housing 11, a Mode One planetary gear assembly, indicated generally at 41, is provided. The Mode One planetary gear assembly 41 includes a sun gear 42, a planetary carrier 43 carrying relatively rotatable planet gears 44, and a ring gear 45. The Mode One sun gear 42 is provided on the rearward end of the torque tube 38 for rotation therewith. The Mode One planetary carrier 43 extends rearwardly into cooperation with a Mode One clutch 46, the purpose for which will be described below. The Mode One planet gears 44 mesh with the Mode One sun gear 42 and the Mode One ring gear 45. The Mode One ring gear 45 is splined to the input shaft 12 for rotation therewith.

Also within the rear chamber of the housing 11, a Mode Two planetary gear assembly, indicated generally at 51, is provided. The Mode Two planetary gear assembly 51 includes a sun gear 52, a planetary carrier 53 carrying relatively rotatable planet gears 54, and a ring gear 55. The Mode Two sun gear 52 is also provided on the rearward end of the torque tube 38 for rotation therewith. The Mode Two planetary carrier 53 is formed integrally with or connected to the rearward internal wall 14 of the housing 11. The Mode Two planet gears 54 mesh with the Mode Two sun gear 52 and the Mode Two ring gear 55. The Mode Two ring gear 55 extends rearwardly into cooperation with a Mode Two clutch 56, the purpose for which will also be described below.

The Mode One clutch 46 is provided to selectively connect the Mode One planetary carrier 43 to an output shaft 57 for rotation therewith. Similarly, the Mode Two clutch 55 is provided to selectively connect the Mode Two ring gear 55 to the output shaft 57 for rotation therewith. The output shaft 57 extends outwardly from the housing 11 of the CVT 10 and can be connected in a conventional manner to an axle assembly (not shown) or other mechanism to rotatably drive the wheels of the vehicle. Therefore, depending upon the operation of the clutches 46 and 56, either the Mode One planetary gear assembly 41 or the Mode Two planetary gear assembly 51 will be connected to transmit power to the output shaft 57.

In operation, the input shaft 12 of the CVT 10 is rotated continuously by the engine of the vehicle. The rotation of input shaft 12, in turn, directly rotates the first outboard traction disk 21, the planetary carrier 32 of the co-axial drive section 30, and the ring gear 45 of the Mode One planetary gear assembly 41, all in the same rotational direction. For the purpose of this description, the rotation of the input shaft 12 will be referred to as being in a positive direction, and any oppositely rotating element will be referred to as being in a negative direction. Because of the splined connection between the forwardly extending, hollow cylindrical support 32a and the rearwardly extending collar portion 22a of the second outboard disk 22 the rotation of the planetary carrier 32 of the co-axial drive section 30 causes the second outboard traction disk 22 to also rotate in the same positive direction as the input shaft 12.

The rotating outboard disks 21 and 22 impinge on and rotate the traction rollers 24 in a manner that is well known and standard for toroidal type drives. The traction rollers 24 then impinge on and cause the inboard traction disk element 23 to rotate it in a negative direction. The inboard traction disk element 23 thus rotates the first sun gear 31 of the co-axial drive section 30 in a negative direction through the torque tube 26. As a result, the planetary gears 33 and 34 are rotated in a positive direction by the first sun gear 31, and the second sun gear 37 is rotated in a negative direction by rearward planetary gears 34. As a result, the Mode One sun gear 43 is also rotated in a negative direction.

As discussed above, the Mode One sun gear 42 is rotated in a negative direction, while the Mode One ring gear 45 is rotated in a positive direction. Depending upon the ratio of the continuously variable drive section 20, the Mode One planetary carrier 43 will either (1) rotate in a positive direction when the influence of the Mode One ring gear 45 is greater than the influence of the Mode One sun gear 42, (2) rotate in a negative direction when the influence of the Mode One sun gear 42 is greater than the influence of the Mode One ring gear 45, or (2) remain stationary when their influences balance each other. The sum of these two influences, whatever it is, is generated through the Mode One carrier 43 to the Mode One clutch 46. If the Mode One clutch 46 is engaged, then this rotational output is then transmitted to the output shaft 57, causing the output shaft 57 to rotate in the same direction of rotation as the Mode One carrier 43. In this way, the Mode One planetary gear assembly 41 functions as a summing or mixing planetary gear assembly, enabling the output shaft 57 to be rotated in either a positive direction, a negative direction, or kept rotationally stationary.

When the Mode One planetary gear assembly 41 is engaged through the Mode One clutch 46, the CVT 10 operates in a regenerative mode, wherein some of the power/speed that is transmitted from the engine through the input shaft 12 and into the Mode One ring gear 45 is siphoned off through the Mode One planet gears 44 and the Mode One sun gear 42 and routed back to the second sun gear 37 of the co-axial drive section 30. From the second sun gear 37 of the co-axial drive section 30, this siphoned off power/speed is transmitted back through the co-axial drive section 30 and the continuously variable drive section 20 to the input shaft 12 of the engine. How much power is siphoned off in this manner is determined by the ratio or angle of the rollers 24 in the toric cavities. The use of this regenerative design is generally considered to be necessary when no external coupling device (such as a mechanical friction clutch or a fluid torque converter) is provided between the engine and the CVT 10.

As the rotation of the second sun gear 37 of the co-axial drive section 30 is affected, so too is the rotation of the first sun gear 31 and the planetary carrier 32 through the pairs of planet gears 33 and 34. Changes in the rotation of carrier 32 affect the rotation of the input shaft 12 directly through the hub portion 32e and indirectly through the toroidal drive 12 by directly affecting the rotation of the second outboard traction disk 22 and, in turn, the first outboard traction disk 21. In this way, the CVT 10 exhibits a recirculatory power loop between the output gear section 40 and the continuously variable drive section 20 through the co-axial drive section 30.

If enough power/speed is diverted away via the Mode One sun gear 42, the Mode One carrier 43 will not rotate at all. This condition is often referred to as a geared neutral condition. If the rotational speed of the Mode One sun gear 42 further increases beyond the geared neutral condition, the rotation of Mode One carrier 43 will reverse in direction and go opposite to the direction of rotation of the Mode One ring gear 45. In this way, the CVT 10 is operated in a reverse ratio. The Mode One planetary gear assembly 41 can, therefore, operate the CVT 10 from a small reverse regime through a geared neutral or zero output speed and then into a forward speed.

However, because of the regenerative operation described above, the Mode One carrier 43 is somewhat limited in its ability to provide higher forward speeds. Thus, the Mode Two planetary gear assembly 51 is provided to supplement the forward ratio of the Mode One planetary gear assembly 41 to enable greater forward speeds to be attained. When a predetermined rotational speed of the Mode One planetary gear assembly 41 is neared or reached, the CVT 10 is shifted from operation through the Mode One planetary gear assembly 41 to operation through the Mode Two planetary gear assembly 51. This can be accomplished by disengaging the Mode One clutch 46 and engaging the Mode Two clutch 56. This operation is referred to as a mode shift. Preferably, the mode shift occurs at or near the point at which the rotational speed of the Mode One carrier 43 is approximately equal to the rotational speed of the Mode Two ring gear 45. This point is referred to as a mode point. The operation of the CVT 10 to perform the mode shift at the mode point is described in further detail below.

When the Mode Two planetary gear assembly 51 is engaged through the Mode Two clutch 56, power from the input shaft 12 is transmitted through the continuously variable drive section 20 and the co-axial drive section 30 to rotate the Mode Two sun gear 52 in a negative direction. This causes the Mode Two planet gears 54 to rotate in a positive direction, which results in the Mode Two ring gear 55 rotating in a positive direction. The Mode Two ring gear 55 directly rotates the output shaft 57 through the Mode Two clutch 56. Because the Mode Two carrier 53 is fixed to the rearward wall 14 of the housing 11, there is only one input and one output for the Mode Two planetary gear assembly 51. Thus, the Mode Two planetary gear assembly 51 also allows the CVT 10, while in its forward regime, to reach its upper operating speeds by transmitting power directly from the input shaft 12 to the output shaft 57. When the Mode Two planetary gear assembly 51 is engaged, the CVT 10 is operated in a split torque mode. Most of the torque is passed through the continuously variable drive section 20, the co-axial drive section 30, and the Mode Two planetary gear assembly 51 to the output shaft 57. A small amount of torque, however, is passed from the input shaft 12 directly to the planetary carrier 12 of the co-axial drive section 20, where it is summed with the other torque.

Although the output gear section 40 has been described and illustrated as including two planetary gear assemblies 41 and 51, it will be appreciated that other types of gear assemblies can be used. Also, the output gear assembly 40 may further include one or more additional planetary gear assemblies (not shown) if desired for further extending the available overall ratios of the CVT 10. Lastly, the operation of the two illustrated planetary gear assemblies 41 and 51 is controlled by the clutches 46 and 56. However, other control devices, such as brakes and the like, may be used to control the operation of the two planetary gear assemblies 41 and 51.

Figure 2:
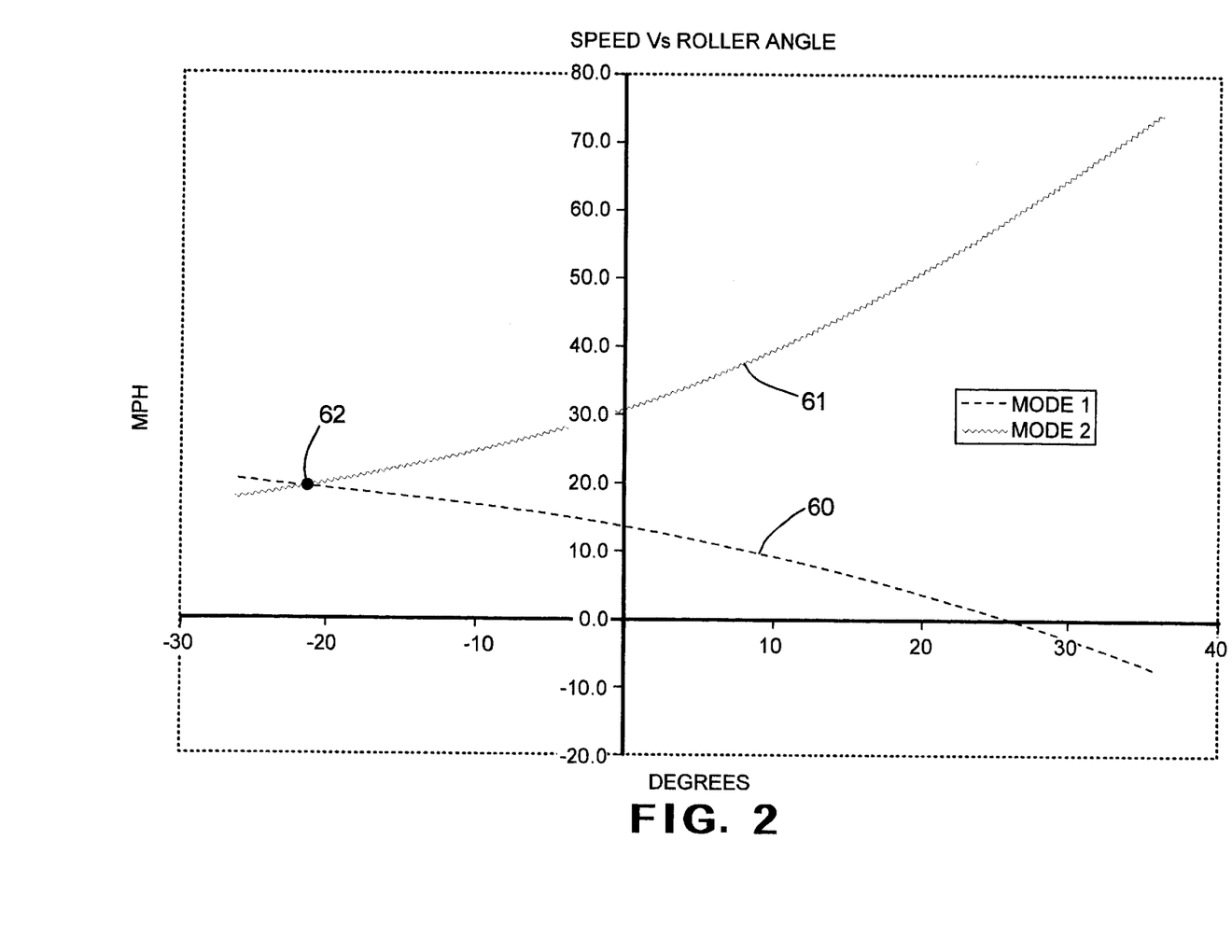
FIG. 2 is a graph that illustrates the rotational speed of the output shaft illustrated in FIG. 1 as a function of the angle at which the traction rollers are oriented relative to the disks when both the Mode One clutch and the Mode Two clutch are engaged, assuming a constant rotational speed of the input shaft.

FIG. 2 is a graph that illustrates the rotational speed of the output shaft 57 as a function of the angle at which the traction rollers 24 are oriented relative to the disks 21, 22, and 23 when both the Mode One clutch 46 and the Mode Two clutch 56 are As engaged, assuming a constant rotational speed of the input shaft 12. As shown by the dotted line 60, when the Mode One planetary gear assembly 41 is connected to the output shaft 57 by the Mode One clutch 46, the rotational speed of the output shaft 57 decreases as the angle of the traction rollers 24 increases. However, as shown by the solid line 61, when the Mode Two planetary gear assembly 51 is connected to the output shaft 57 by the Mode Two clutch 56, the rotational speed of the output shaft 57 increases as the angle of the traction rollers 24 increases. The two lines 60 and 61 intersect at a point 62, which is referred to as the mode point. The mode point 62 represents the angle of the traction rollers 24 where the rotational speed of the output shaft 57 is the same regardless of whether the Mode One clutch 46 or the Mode Two clutch 56 is engaged. Ideally, to obtain a smooth transition, the above-described mode shift occurs only when the traction rollers 24 are positioned at (or at least near) the mode point 62.

2. Control System And Feedback Mechanism

Figure 3:
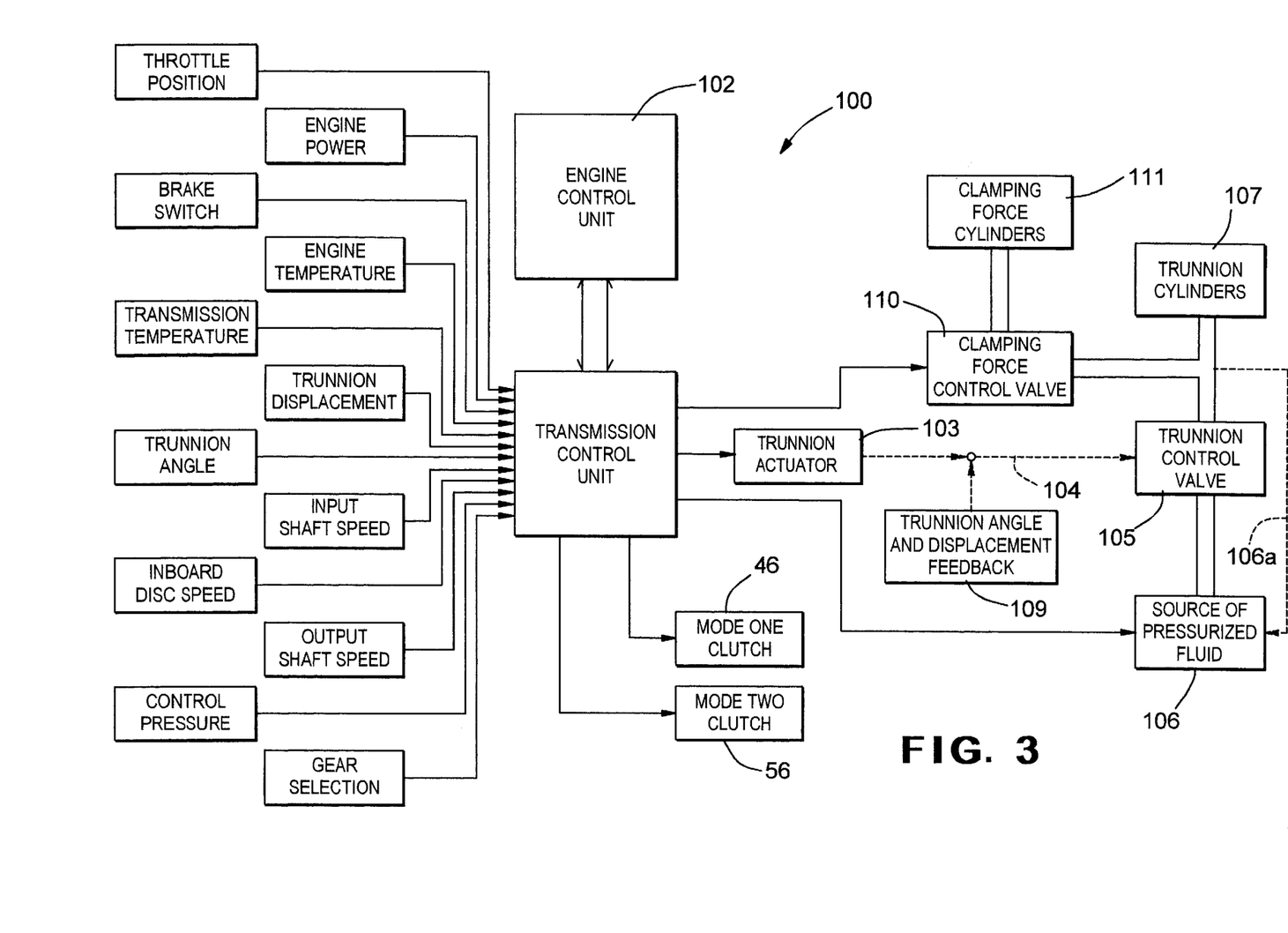
FIG. 3 is a block diagram of a control system for operating the toroidal drive type transmission illustrated in FIG. 1.

Referring now to FIG. 3, there is illustrated a block diagram of a control system, indicated generally at 100, for operating the CVT 10 described above. The control system 100 includes a transmission control unit 101 that may, for example, be embodied as any conventional microprocessor, programmable controller, or similar electronic computing device. Typically, the transmission control unit 101 communicates with a similar electronic engine control unit 102 that is provided on the vehicle for controlling the operation of the engine of the vehicle. The interactions between the transmission control unit 101 and the engine control unit 102 are generally conventional in the art.

The transmission control unit 101 receives a number of input signals that are representative of various operating conditions of the CVT 10 and other portions of the vehicle. As shown in FIG. 3, such input signals can include a variety of signals that are representative of the operating conditions of the vehicle engine, such as throttle pedal position, engine power and/or governed speed, engine temperature, and the rotational speed of the input shaft 12 to the CVT 10 (which is rotatably driven directly by the engine). Such signals may, if desired, be provided to the transmission control unit 101 from the engine control unit 102. Alternatively, such signals may be provided to the transmission control unit 101 from discrete sensors. The input signals to the transmission control unit 101 can also include a variety of signals that are representative of the operating conditions of the CVT 10, such as transmission temperature, the rotational speed of the inboard disk 23, the rotational speed of the output shaft 57 (which, depending upon the direction of rotation may be positive or negative), the axial displacement of the trunnion 25, the angular displacement of the trunnion 25, and the magnitude of the control pressure supplied to actuate the trunnion 25. Such signals are preferably provided to the transmission control unit 101 from discrete sensors. Lastly, the input signals to the transmission control unit 101 can further include a variety of signals that are representative of the operating conditions of other portions of the vehicle, such as brake actuation and gear selector position. The above list of input signals to the transmission control unit 101 is not intended to be exhaustive, but rather merely exemplary of some of the input signals that can be used by the transmission control unit 101 to control the operation of the CVT 10, such as throttle valve position and fuel governor position, for example.

In response to these input signals, the transmission control unit 101 generates output signals to control the gear train selection in the output gear assembly 40. As discussed above, the illustrated CVT 10 includes the pair of planetary gear assemblies 41 and 51 that are selectively engaged and disengaged to rotatably drive the output shaft 57 as desired. Thus, in the illustrated embodiment, the output signals from the transmission control unit 101 control the operation of the Mode One clutch 46 and the Mode Two clutch 56 in the manner described above. The specific mechanisms for operating such clutches 46 and 56 are well known in the art and need not be explained here for a complete understanding of this invention. The specific strategy for shifting between the Mode One clutch 46 and the Mode Two clutch 56 will be described in further detail below.

The transmission control unit 101 also generates output signals to control the movements of the trunnions 25 so as to effect changes in the ratio of the continuously variable drive section 20. As mentioned above, the rollers 24 are supported on respective trunnions 25 in such a manner as to be movable relative to the outboard disks 21 and 22 and the inboard disk 23 to initiate a change in such ratio. Accordingly, by controlling the movements of the trunnions 25, the angles of the rollers 24 relative to the disks 21, 22, and 23 (and, thus, the ratio of the continuously variable drive section 20) can be controlled in a desired manner. The specific structure for accomplishing this is illustrated schematically in FIG. 4. As shown therein, a trunnion actuator 103 receives output signals from the transmission control unit 101 to control the operation thereof. The trunnion actuator 103 is generally conventional in the art and is adapted to generate mechanical movements in response to the output signals from the transmission control unit 101. The trunnion actuator 103 may, for example, be embodied as any known device, electromechanical or otherwise, that is responsive to the output signals from the transmission control unit 101 for causing corresponding linear reciprocating movement of an output member 103a.

Figure 4:
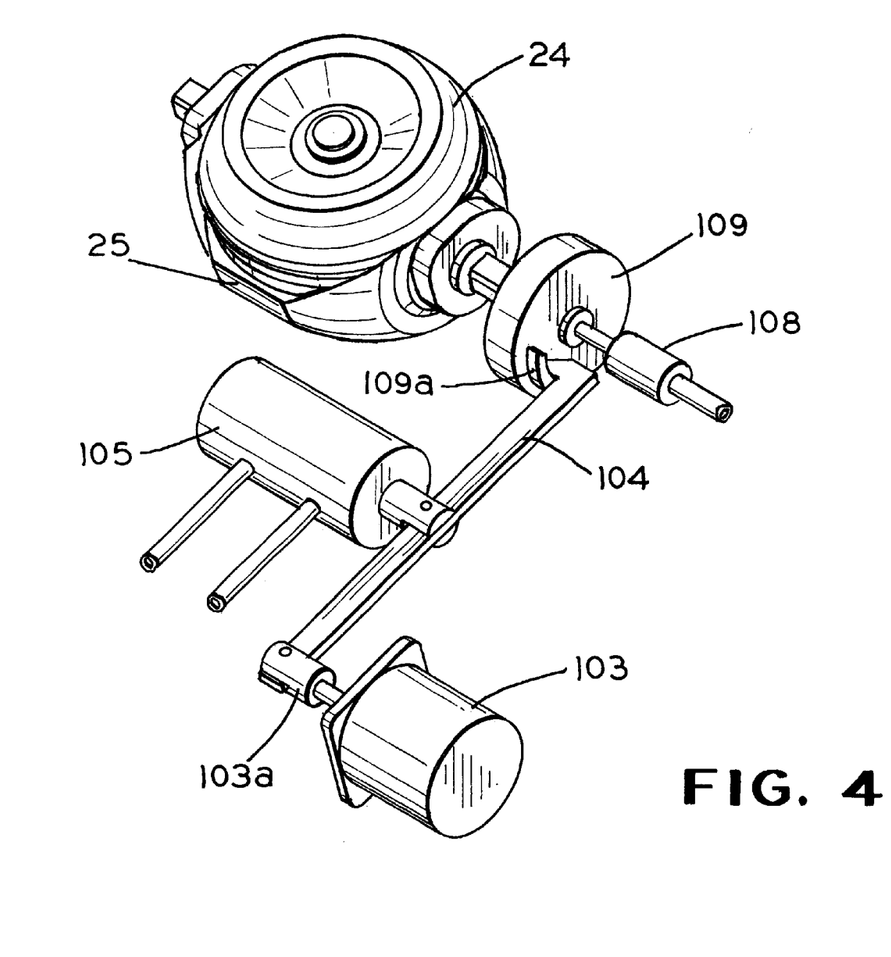
FIG. 4 is a schematic perspective view of the mechanical control and feedback mechanism of the control system illustrated in FIG. 3.

The output member 103a of the trunnion actuator 103 is connected through a mechanical link 104 to an input member 105a of a trunnion control valve 105. In the illustrated embodiment, the output member 103a of the trunnion actuator 103 is connected to a first end of the mechanical link 104, while the input member 105a of the trunnion control valve 105 is connected to a central portion of the mechanical link 104. However, the trunnion actuator 103 and the trunnion control valve 105 may be connected to the mechanical link 104 in any desired manner. The trunnion control valve 105 is also conventional in the art and may, for example, be embodied as any known hydraulic valve that is capable of controlling the flow of fluid therethrough in response to movement of the mechanical link 104. Typically, the trunnion control valve 105 is connected between a source of pressurized hydraulic fluid 106 and each of the trunnion cylinders 107 that are mechanically connected to the trunnions 25 shown in FIG. 1. By supplying pressurized fluid to these trunnion cylinders 107, mechanical movement of the trunnions 25 can be effected.

Figure 5:
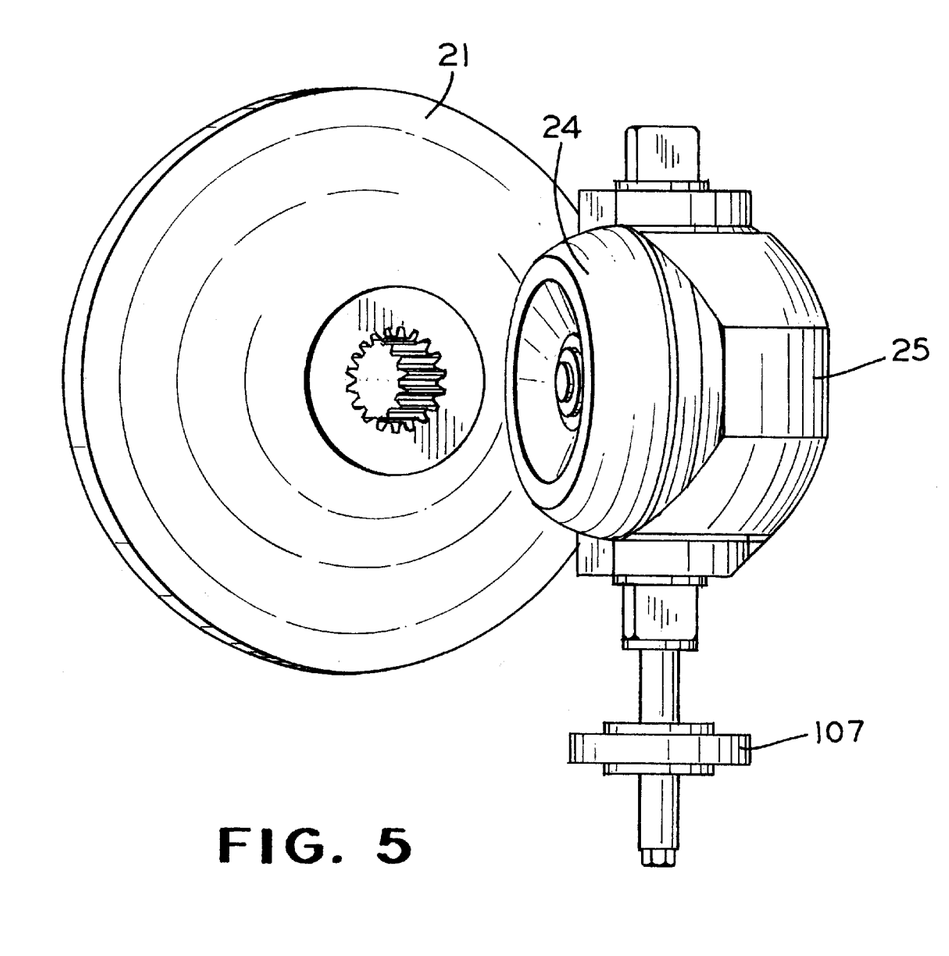
FIG. 5 is a schematic perspective view of one of the disks, one of the trunnions, and one of the traction rollers illustrated in FIG. 1, wherein the trunnion and the traction roller are shown in a centered position relative to the disk.
Figure 6:
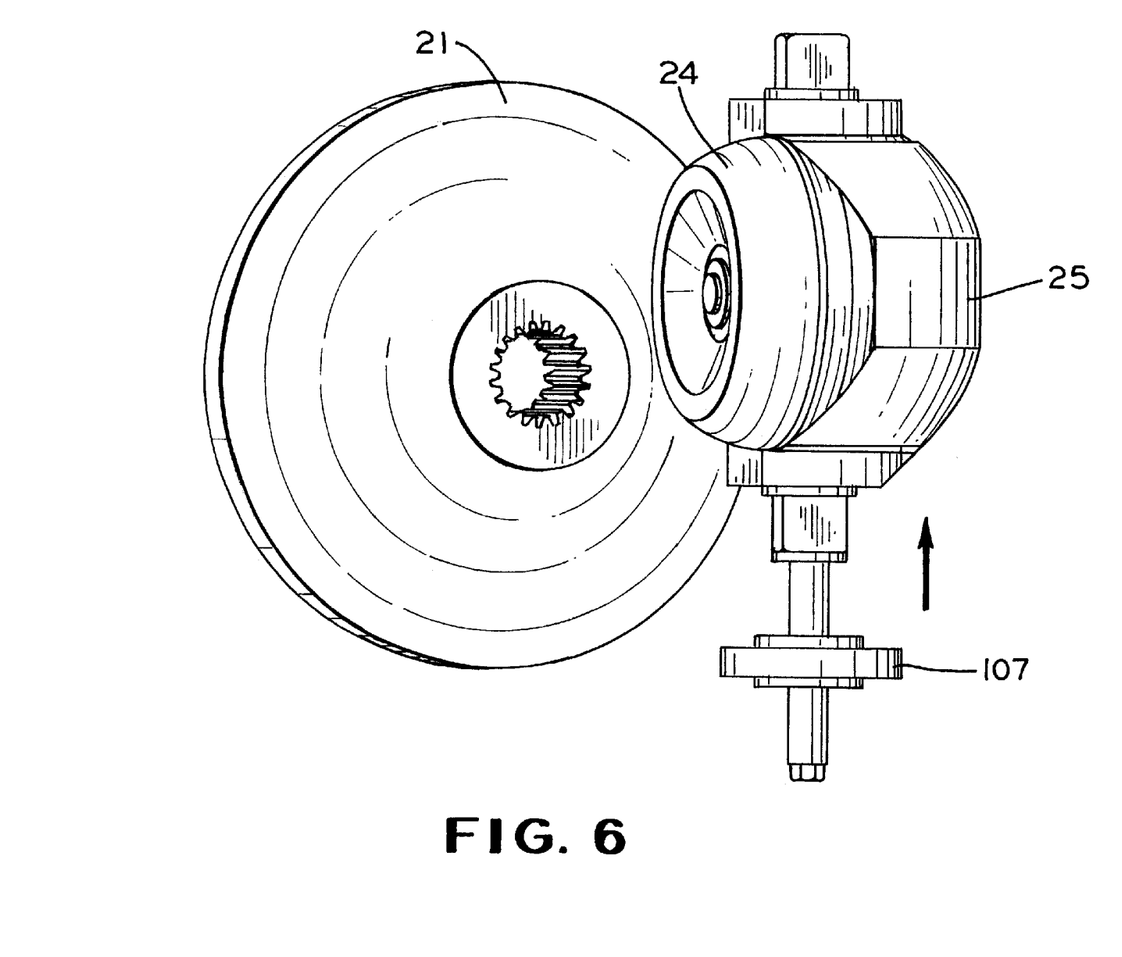
FIG. 6 is a schematic perspective view similar to FIG. 5, wherein the trunnion and the traction roller are shown in an axially displaced position relative to the disk.
Figure 7:
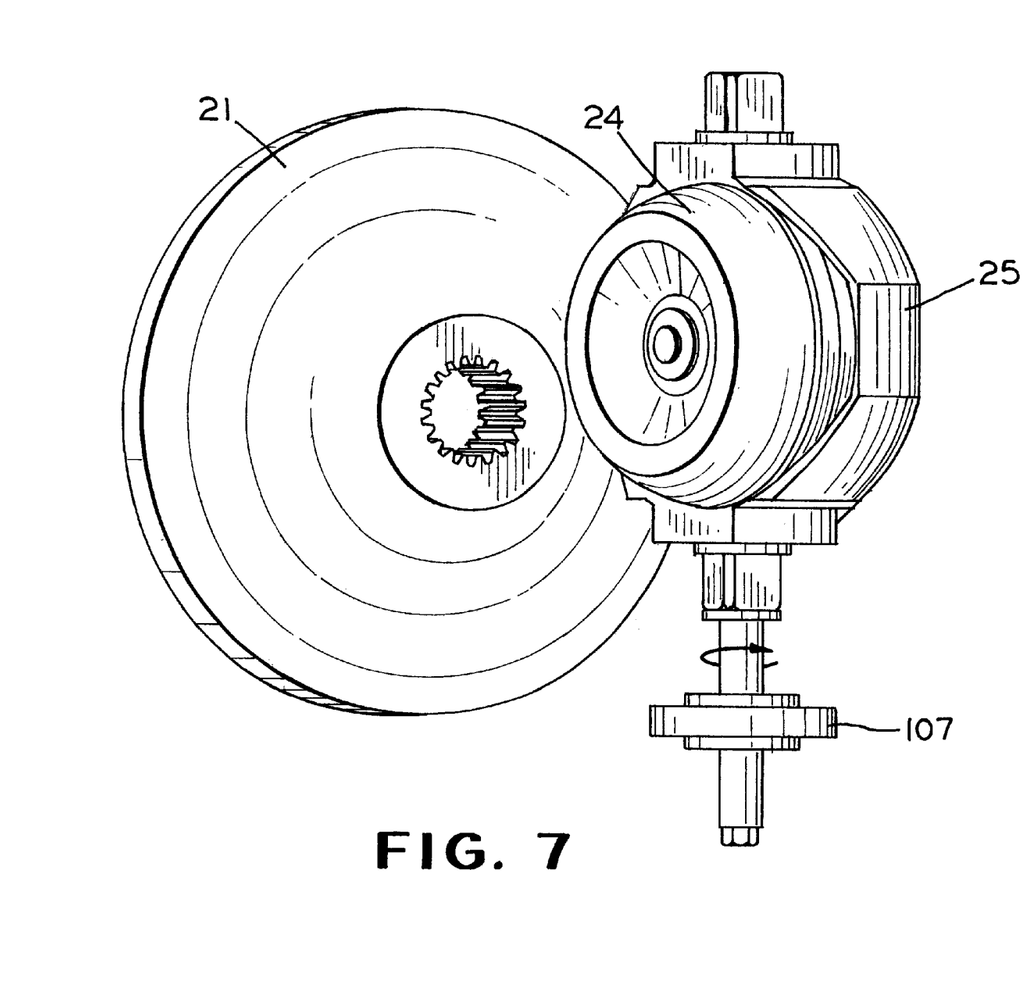
FIG. 7 is a schematic perspective view similar to FIG. 6, wherein the trunnion and the traction roller are shown in an axially and rotational displaced position relative to the disk.

The manner in which the trunnion 25 can be moved by operation of the trunnion control valve 105 is shown in FIGS. 5, 6, and 7. For the purpose of illustration, let it be assumed that the trunnion 25 is initially in the position illustrated in FIG. 5, wherein the roller 24 is essentially centered relative to axis of rotation of the illustrated disk 21 and engages the disk 21 at a predetermined radius from the center thereof. To accomplish this, a certain amount of pressurized fluid is supplied from the source of pressurized fluid 106 through the trunnion control valve 105 to the associated trunnion cylinder 107. The trunnion cylinder 107 includes a control piston 107a that is connected to the trunnion 25 for axial movement therewith. The control piston 107a is disposed within the trunnion cylinder 107 so as to divide the interior thereof into two chambers. When the magnitude of pressurized fluid supplied to the two chambers is different, a differential force is exerted against the control piston 107a, urging to move axially relative to the trunnion cylinder 107.

As a practical matter, in order to maintain the control piston 107a in a static position within the trunnion cylinder 107, such as in the centered position illustrated in FIG. 5, fluid pressure of a predetermined magnitude is supplied to the first chamber, while the second chamber is essentially vented. The resultant pressure differential created across the control piston 107a causes a first axial force to be exerted against the control piston 107a, urging it to move axially in a first direction relative to the trunnion cylinder 107. This first axially directed force is counteracted by a second similar, but oppositely directed reaction force that is exerted against the trunnion 25 as a result of the engagement of the roller 24 between one of the outboard disks 21 and 22 and the inboard disk 23. Because these first and second axially directed forces are essentially identical in magnitude, but opposite in direction, the trunnion 25 is maintained in a static position, such as the centered position illustrated in FIG. 5. In this position, the roller 24 effects a predetermined ratio between the outboard disks 21 and 22 and the inboard disk 23 of the continuously variable drive section 20.

To vary the ratio of the continuously variable drive section 20, the magnitudes of fluid pressure in either or both of the first and second chambers of the trunnion cylinder 107 are increased or decreased (depending upon the desired direction of movement) to vary the differential pressure across the control piston 107a. To accomplish this, the trunnion actuator 103 is operated by the transmission control unit 101 to move the output member 103a. This causes the mechanical link 104 to be moved, resulting in corresponding movement of the input member 105a of the trunnion control valve 105. As a result, the amount of pressurized fluid supplied from the source of pressurized fluid 106 through the trunnion control valve 105 to the first and second chambers of the trunnion cylinder 107 is varied. In response to such fluid pressure changes, the magnitude of the differential pressure across the control piston 107a (and, therefore, the magnitude of the first axial force exerted against such control piston 107a) is changed to be different from the second reaction force described above. In the illustrated embodiment, the operation of the source of pressurized fluid 106 is directly controlled by the transmission control unit 101, although such is not necessary. For the sake of economy, a feedback loop 106a may be provided for further controlling the operation of the source of pressurized fluid 106 in response to the magnitude of the pressurized fluid in the hydraulic line extending from the trunnion control valve 105 to the trunnion cylinders 107.

Consequently, the control piston 107a, the trunnion 25, and the roller 24 are axially displaced relative to the disk 21, such as shown by the arrow in FIG. 6. The roller 24 now engages the disk 21 at a different radius from the center thereof than as shown in FIG. 5. In compliance with a steering vector force that is now generated by the engagement of the axially displaced roller 24 with the disk 21, the roller 24 and the trunnion 25 then rotate relative to the axis of movement, as shown by the arrow in FIG. 7. In this manner, axial movement of the trunnion 25 causes the roller 24 to effect a different ratio between the outboard disks 21 and 22 and the inboard disk 23 than as shown in FIG. 5.

Referring back to FIG. 4, a sensor 108 is connected to the trunnion 25 for axial and rotational movement therewith. The sensor 108 is responsive to these axial and rotational movements for generating electrical signals that are representative thereof back to the transmission control unit 101. The sensor 108 can be embodied as any conventional sensor or plurality of sensors. The purpose for the sensor 108 will be explained below.

As shown in FIG. 3, a feedback mechanism 109 is provided for enhancing the stability of the movement of the trunnion 25 described above. One exemplary structure of the feedback mechanism 109 is shown in FIG. 4 as an annular cam that is secured to the trunnion 25 for axial and rotational movement therewith. The illustrated cam 109 has a curved ramp surface 109a formed on one side thereof. As mentioned above, the output member 103a of the trunnion actuator 103 is connected to a first end of the mechanical link 104, while the input member 105a of the trunnion control valve 105 is connected to a central portion of the mechanical link 104. A second end of the mechanical link 104 bears upon the curved ramp surface 109a formed on the cam 109. As a result, when the trunnion 25 is displaced axially and rotationally as described above, the second end of the mechanical link 104 is moved therewith. Such movement of the second end of the mechanical link 104 is designed to limit the ability of the trunnion actuator 103 to effect movement of the input member 105a of the trunnion control valve 105.

For example, assume that the transmission control unit 101 generates an output signal to the trunnion actuator 103 to effect movement of the trunnion 25. In response to that output signal, the trunnion actuator 103 extends the output member 103a, causing movement of the mechanical link 104. Such movement causes the input member 105a of the trunnion control valve 105 to be moved in such a manner as to change the amount of pressurized fluid supplied to the trunnion cylinder 107. This change in the amount of pressurized fluid causes the trunnion 25 to be initially axially displaced in the manner described above. However, such axial displacement of the trunnion 25 causes the cam 109 to move axially as well. Because the second end of the mechanical link 104 bears upon the cam 109, such axial displacement of the trunnion 25 causes movement of the input member 105a of the trunnion control valve 105. Thus, the axial displacement of the trunnion 25 functions to provide negative feedback to the input member 105a of the trunnion control valve 105 which is sufficient to limit the magnitude of the axial displacement of the trunnion 25. As a result, the response rate of the trunnion control valve 105 is reduced in accordance with the axial displacement of the trunnion 25.

Additionally, as described above, axial displacement of the trunnion 25 causes rotational displacement as well. As mentioned above, the cam 109 is connected to the trunnion 25 for rotational movement therewith. Because the second end of the mechanical link 104 bears upon the curved ram surface 109a of the cam 109, such rotational displacement of the trunnion 25 causes further movement of the second end of the mechanical link 104 and, therefore, the input member 105a of the trunnion control valve 105. Thus, the rotational displacement of the trunnion 25 functions to provide further negative feedback to the input member 105a of the trunnion control valve 105. The negative feedback from the rotational displacement of the trunnion 25 is sufficient to cause the trunnion control valve 105 to restore the trunnion 25 to the centered or equilibrium position illustrated in FIG. 5. Thus, it can be seen that the negative feedback generated by the axial displacement of the trunnion 25 is effective to slow or otherwise limit the rate of change of such axial movement, while the negative feedback generated by the rotation displacement of the trunnion 25 is effective to limit the magnitude of such change.

It will be appreciated that the shape of the curved ram surface 109a of the cam 109 can be varied as desired to provide a desired amount of negative feedback. Thus, the ratio of rise per unit rotation of the curved ram surface 109a of the cam 109 can be linear or non-linear as desired. Such a non-linear rate of change can be used to customize the magnitude of the negative feedback for the particular rotational displacement of the trunnion 25 and the roller 24 to account for varying degrees of sensitivity of the structure at varying rotational positions. Similarly, if desired, the negative feedback resulting from the axial displacement of the trunnion 25 can be varied in a non-linear manner. This can be accomplished by feeding the axial displacement from the sensor 108 back to the transmission control unit 101, where it can be used to modify the initial control signal generated to the trunnion actuator 103. Alternatively, a mechanical system (not shown) can be employed to vary the negative feedback resulting from the axial displacement of the trunnion 25 in a non-linear manner.

The above-described feedback mechanism 109 is a purely mechanical system. However, it will be appreciated that the same result can be achieved using an electronic feedback mechanism. Such a mechanism can be provided by employing an electrically actuated trunnion control valve, instead of the illustrated mechanically actuated trunnion control valve 105. The input signal from the transmission control unit 101 to such an electrically actuated trunnion control valve would be summed with electrical feedback position signals that are representative of the axial and rotational displacement of the trunnion 25, such as from the sensor 108. In a manner similar to that described above, the electrical negative feedback functions to limit the rate of change and magnitude of the displacement of the trunnion 25. An electronic feedback mechanism could additionally be responsive to a variety of other operating conditions, including speed, ratio, temperature, mode of operation (i.e., whether the Mode One planetary gear assembly 41 or the Mode Two planetary gear assembly 51 is clutched to the output shaft 57), and whether the CVT 10 is being operated in torque or ratio control, as described below.

Lastly, the transmission control unit 101 further generates output signals to control the magnitude of the clamping force exerted by traction rollers 24 against the disks 21, 22, and 23. To accomplish this, a clamping force control valve 110 receives output signals from the transmission control unit 101 to control the operation thereof. The clamping force control valve 110 is generally conventional in the art and may, for example, be embodied as any known hydraulic valve that is capable of controlling the flow of fluid therethrough in response to the output signals from the transmission control unit 101. Typically, the clamping force control valve 110 is connected between the trunnion control valve 105 and a plurality of clamping force cylinder assemblies 110 that are typically located in the trunnions 25 or behind the rollers 24 shown in FIG. 1. The operation of the illustrated clamping force control valve 110 is controlled directly by the transmission control unit 101, although such is not necessary. By supplying pressurized fluid to these clamping force cylinder assemblies 111, the magnitude of the normal force exerted by traction rollers 24 against the disks 21, 22, and 23 can be varied as desired. The operation of the clamping force cylinder assemblies 111 in this manner is generally conventional in the art.

An additional aspect of this invention relates to the manner in which pressurized fluid is supplied to the chambers of the trunnion cylinder 107 during a mode shift (i.e., when the Mode One clutch 46 and the Mode Two clutch 56 are actuated to reverse the connection of the two planetary gear assemblies 41 and 51 to the output shaft 57). As mentioned above, pressurized fluid is supplied to the two chambers of the trunnion cylinder 107 so as to position the control piston 107a as desired therein. Also, in the manner described above, the negative feedback generated by the interaction of the mechanical link 104 with the cam 109 limits the rate of change and magnitude of such movement by re-establishing the equilibrium across the control piston 107a after a certain amount of axial and rotational displacement.

It is known that when a mode shift is effected in the output gear section 40, a reversal of torque occurs within the continuously variable drive section 20 of the CVT 10. In order to maintain the control piston 107*a* in the same position within the trunnion cylinder 107 during this reversal of torque, the magnitudes of fluid pressure in the first and second chambers of the trunnion cylinder 107 must be reversed and altered in accordance with the new reaction force, which may be different from the original reaction force. In other words, the magnitude of fluid pressure within the first chamber (which was relatively high before the mode shift) must be decreased, and the magnitude of fluid pressure within the second chamber (which was relatively low before the mode shift) must be increased. When this is done, the control piston 107*a* is maintained in the same position within the trunnion cylinder 107 after the reversal of torque occurs during the mode shift.

In the past, these reversing adjustments of the magnitudes of fluid pressure within the first and second chambers of the trunnion cylinder 107 occurred simultaneously when the mode shift was initiated. In other words, the relatively high fluid pressure in the first chamber was decreased simultaneously as the relatively low fluid pressure in the second chamber was increased. Although effective, it has been found that such simultaneous adjustments of the magnitudes of fluid pressures within the first and second chambers of the trunnion cylinder 107 can result in undesirable transient movements of the control piston 107*a* and, therefore, the trunnions 25 during the mode shift.

To prevent this from occurring, this invention contemplates that prior to the commencement of the mode shift, the magnitude of fluid pressure within the first chamber (which was initially relatively high) is further increased above the originally relative high level, and the magnitude of fluid pressure within the second chamber (which was initially relatively low) is increased by a similar magnitude. This simultaneous increase in fluid pressures in both of the first and second chambers of the trunnion cylinder 107 maintains the same pressure differential across the control piston 107*a*. Thus, no axial movement of the control piston 107*a* occurs during this initial pressurization phase. Accordingly, when the mode shift occurs, all that is required is to vent the first chamber of the trunnion cylinder 107 to effect the reversing adjustments of the magnitudes of fluid pressure within the first and second chambers of the trunnion cylinder 107. It has been found that the venting of the first chamber can occur more rapidly than the pressurization of the second chamber, as previously performed. Consequently, because all that is required is to vent the first chamber, undesirable transient movements of the control piston 107*a* during the mode shift are effectively avoided.

3. Dual Strategy Control

As discussed above, the transmission control unit 101 of the control system 100 is responsive to the various input signals supplied thereto for generating output signals to actuate the trunnion actuator 103. In response thereto, the trunnion actuator 103 is effective to operate the trunnion control valve 105, which regulates the magnitude of pressurized fluid that is provided to the first and second chambers of the trunnion cylinder 107. For toroidal drive type continuously variable transmissions that utilize pressurized fluid to effect movement of the trunnions 25, such as the illustrated CVT 10 discussed above, the magnitude of this pressurized fluid (which is referred to as the control pressure) is the root action of any control strategy used to control the operation of the CVT 10. Thus, if the control pressure in the trunnion cylinder 107 is increased above an equilibrium point, then the ratio of the continuously variable drive section 20 will increase. Similarly, if the control pressure in the trunnion cylinder 107 is decreased below the equilibrium point, then the ratio of the continuously variable drive section 20 will decrease. Finally, if the control pressure in the trunnion cylinder 107 is maintained at the equilibrium point, then the ratio of the continuously variable go drive section 20 will not change.

There are two commonly known control strategies of operation for operating the CVT 10. The first control strategy is referred to as the torque control strategy.

When the CVT 10 is operated in the torque control strategy, the goal of the control system 100 is to correlate the throttle pedal position of the engine (as set by the driver of the vehicle using the accelerator pedal) with a desired amount of thrust for the vehicle. Thus, when the throttle pedal position is relatively low, it can be inferred that the driver of the vehicle desires a relatively small amount of such thrust as a response. Conversely, when the throttle pedal position is relatively high, it can be inferred that the driver of the vehicle desires a relatively large amount of such thrust as a response.

Torque control operation of the CVT 10 is achieved by correlating the throttle pedal position to a predetermined magnitude of pressure at the trunnion cylinders 107. As discussed above, the magnitude of this control pressure is directly related to the axial displacement of the trunnions 25 and, therefore, the angle of the traction rollers 24. Accordingly, as also discussed above, the magnitude of this control pressure is also directly related to the ratio provided by the continuously variable drive section 20 of the CVT 10. For example, let it be assumed that the throttle is moved to and maintained at a single predetermined position. The transmission control unit 101 is responsive to that throttle pedal position for determining a single predetermined magnitude of the control pressure that is to be supplied to the trunnion cylinders 107. Accordingly, the transmission control unit 101 will actuate the trunnion actuator 103 (and, thus, the trunnion control valve 105) to achieve the desired control pressure in the trunnion cylinder 107. Consequently, the trunnions 25 are axially displaced in the manner described above, resulting in the continuously variable drive section 20 being operated at a ratio angle of the trunnions 25 that allows a balance between the torque from the engine and the desired control pressure. The vehicle responds, at least under normal circumstances, by gradually accelerating at a rate that is related to the single predetermined ratio as determined by the throttle pedal position.

As a practical matter, however, the throttle pedal position often varies considerably when the vehicle is operated at a relatively low speed, wherein acceleration and deceleration of the vehicle is relatively frequent. For each throttle pedal position, the control system 100 determines a corresponding control pressure. Accordingly, during such relatively low speed operation, the transmission control unit 101 will continually adjust the control pressure in the trunnion cylinders 107 in accordance with the throttle pedal position. As a result, the magnitude of the thrust supplied by the CVT 10 to the wheels of the vehicle will vary as well. The torque control strategy is well suited for operating the CVT 10 at relatively low vehicle speeds because it can provide for very smooth acceleration of the vehicle, particularly when the CVT 10 is operated in the lower ratios, similar to a torque converter or similar fluid coupling structure. When the vehicle is operated at relatively high speeds, the throttle pedal position usually varies by a lesser amount. When the throttle pedal position is relatively constant (at any vehicle speed), the transmission control unit 101 will cause a relatively constant amount of thrust to be generated. As a result, the vehicle will be operated, at least under normal circumstances, at a relatively constant speed.

Unfortunately, the torque control strategy is not well suited for facilitating the performance of the mode shift described above, such as when the CVT 10 is shifted from the Mode One planetary gear assembly 41 to the Mode Two planetary gear assembly 51 by disengaging the Mode One clutch 46 and engaging the Mode Two clutch 56. As mentioned above, the mode shift preferably occurs at or near the mode point, wherein the Mode One carrier 43 rotates at the same speed as the Mode Two ring gear 45. When operated in the torque control strategy, the CVT 10 is unable to precisely control when the mode point occurs because it is focused on obtaining and maintaining the desired control pressure at the trunnion cylinder 107, regardless of the rotational speeds of the components therein. In the torque control strategy, the mode shift occurs when the mode point is sensed by the transmission control unit 101. However, the transmission control unit 101 is unable to direct the components of the CVT 10 to the mode point or hold them at the mode point until the mode shift is completed. Consequently, it has been found that operation of the CVT 10 in the torque control strategy can, at least in some instances, result in the mode shift occurring away from the mode point. This can result in the generation of an undesirable transient torque in the CVT 10 as a result of the unsynchronized mode shift.

Ratio control operation of the CVT 10, on the other hand, is achieved by correlating the throttle pedal position to a predetermined desired rotational speed for the input shaft 12 (i.e., the output rotational speed of the engine). In response to the throttle pedal position signal, the transmission control unit 101, either alone or in combination with the engine control unit 102, decides what rotational speed for the input shaft 12 is most appropriate for the current conditions. For example, let it be assumed that the throttle is moved to and maintained at a single predetermined position. The transmission control unit 101 is responsive to that throttle pedal position (and, in some instances, a signal from the engine control unit 102) for determining a single predetermined desired rotational speed for the input shaft 12. Accordingly, the transmission control unit 101 will actuate the trunnion actuator 103 (and, thus, the trunnion control valve 105) to effect axial displacement of the trunnions 25, resulting in a change in the ratio of the continuously variable drive section 20. The transmission control unit 101 will continue to change the ratio of the continuously variable drive section 20 until the predetermined desired rotational speed for the input shaft 12 is achieved.

As discussed above, the throttle pedal position often varies considerably when the vehicle is operated at a relatively low speed, wherein acceleration and deceleration of the vehicle is relatively frequent. For each throttle pedal position under current conditions, the control system 100 determines a corresponding predetermined desired rotational speed for the input shaft 12. Accordingly, during such relatively low speed operation, the transmission control unit 101 will continually adjust the control pressure in the trunnion cylinders 107. As a result, the rotational speed of the input shaft 12 will be guided toward and maintained at the predetermined desired rotational speed. When the vehicle is operated at relatively high speeds, the throttle pedal position usually varies by a lesser amount. When the throttle pedal position is relatively constant (at any vehicle speed), the transmission control unit 101 will maintain the same ratio in the continuously variable drive section 20 to maintain a relatively constant desired rotational speed for the input shaft 12. As a result, the vehicle will be operated, at least under normal circumstances, at a relatively constant speed.

Unlike the torque control strategy described above, the ratio control strategy is very well suited for effecting the mode shift described above. As mentioned above, the mode shift preferably occurs at or near the mode point, wherein the Mode One carrier 43 rotates at the same speed as the Mode Two ring gear 45. When operated in the ratio control strategy, the CVT 10 is able to precisely control when the mode point occurs because it is focused on obtaining and maintaining the predetermined desired rotational speed for the input shaft 12. That predetermined desired rotational speed for the input shaft 12 can be precisely guided to the synchronized rotational speeds of the Mode One carrier 43 and the Mode Two ring gear 45. Thus, the mode shift will always be performed at the mode point.

Unfortunately, however, it has been found that the ratio control strategy can result in somewhat rough acceleration of the vehicle, particularly when the CVT 10 is operated in the relatively low ratios. This is because the predetermined desired rotational speed for the input shaft 12 may change rapidly in this situation, such as when the vehicle is being initially accelerated from a stationary position. By focusing on ratio and ratio angle in a system whose sensitivity is not constant, it is difficult to stay "in phase" with the system. As a result, undesirable transient torque can be generated in the CVT 10 as a result of the insufficient response of the control system 100.

Figure 8:
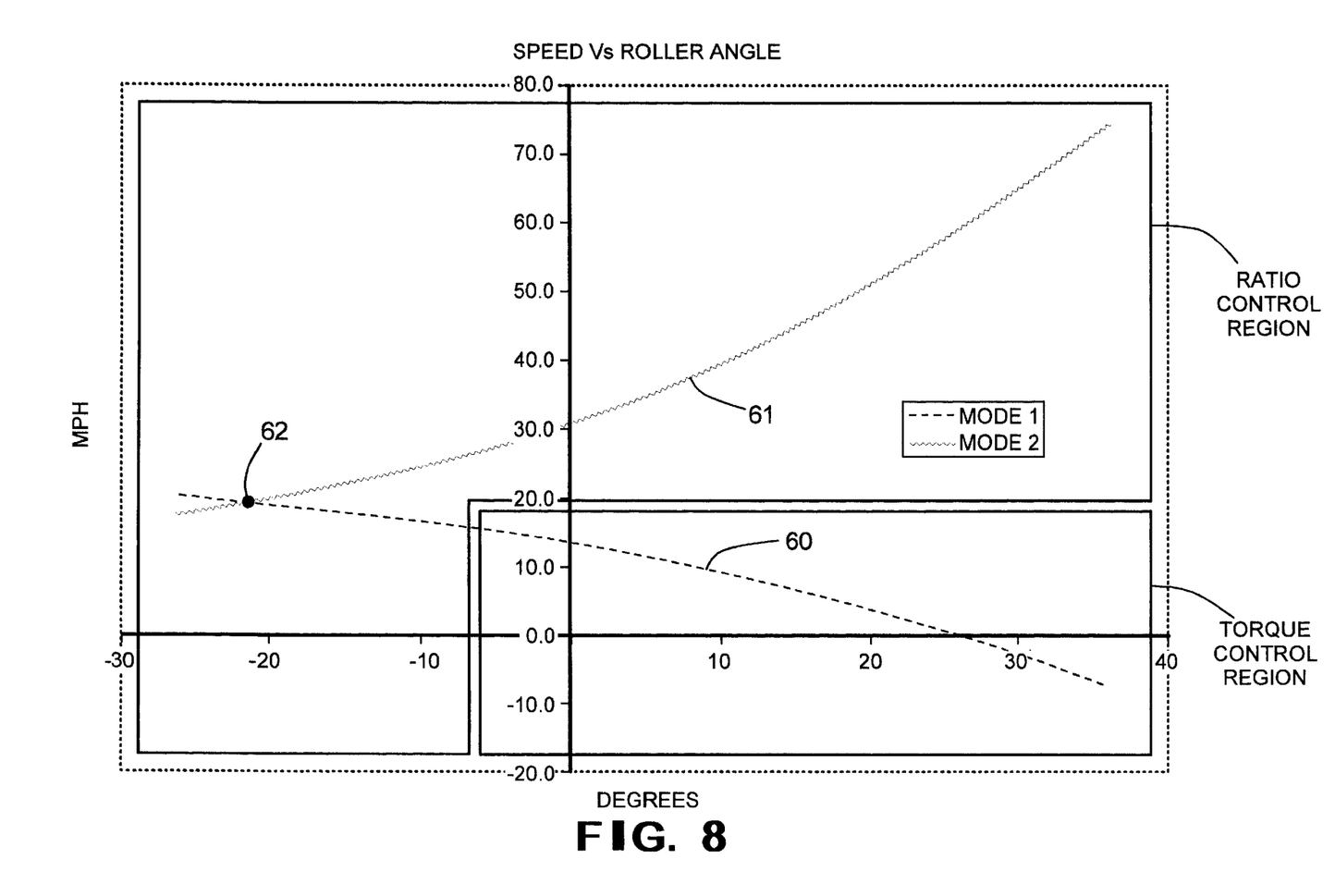
FIG. 8 is a graph similar to FIG. 2 that illustrates the dual strategy operation of the transmission control unit illustrated in FIG. 3 in the torque control strategy during certain situations and in the ratio control strategy during other situations.

Traditionally, the control system 100 illustrated in FIG. 3 has been programmed to operate the CVT 10 illustrated in FIG. 1 either in the torque control strategy or in the ratio control strategy. As discussed above, both of such control strategies have disadvantages that can occur under certain operating conditions. To address this shortcoming, this invention contemplates that the CVT 10 be operated in the torque control strategy during certain operating conditions and in the ratio control strategy during other operating conditions. In particular, with reference to FIG. 8, it has been found to be desirable to operate the CVT 10 in the torque control strategy at relatively low vehicle speeds, such as shown by the box identified as the torque control region. At such low vehicle speeds, the CVT 10 is effective as described above to provide a very smooth acceleration, particularly when operated in the low ratios. As indicated by the dotted line 60, the torque control region encompasses operation of the CVT 10 only when the Mode One clutch 46 is engaged. Thus, as described above, the CVT 10 can be operated to effect either forward, stationary, or reverse movement of the vehicle at relatively low speeds under torque control. Such operation is consistent with the advantageous aspects of the torque control strategy described above.

However, as also discussed above, the ratio control strategy is well suited for facilitating the performance of the mode shift because of the affirmative speed control. Thus, in accordance with this invention, as the vehicle accelerates and approaches the mode point 62, a transition is made from the torque control strategy to the ratio control strategy, such as shown by the box identified as the ratio control region in FIG. 8. Preferably, the transition from the torque control strategy to the ratio control strategy is performed somewhat before the mode point is reached. This is done to allow the CVT 10 to utilize the ratio control strategy to precisely achieve the mode point, wherein the rotational speeds of the Mode One carrier 43 and the Mode Two ring gear 45 are synchronized. When the mode point is achieved, the mode shift is effected, and further operation of the CVT 10 continues under ratio control, as indicated by the solid line 61. Thus, it can be seen that the CVT 10 is operated in such a manner as to benefit from the advantageous aspects of both the torque and ratio control strategies, while avoiding the disadvantageous aspect of both strategies.

The transition from the torque control strategy to the ratio control strategy (and vice versa) can be accomplished simply by programming the transmission control unit 101 to switch abruptly from one control strategy to the other control strategy at any desired predetermined point of operation. However, to insure a smooth transition occurs that is transparent to the driver of the vehicle, it is desirable that this transition occur gradually over a predetermined range of such operation, such as indicated by the small gap between the torque control region box and the ratio control region box in FIG. 8. To accomplish this, the transmission control unit 101 can be programmed to simultaneously calculate the control valve settings that would result from operation in both the torque and ratio control strategies, and further to assign a weighted factor or value to each of such calculated control valve settings based upon the current operating conditions.

Figure 9:
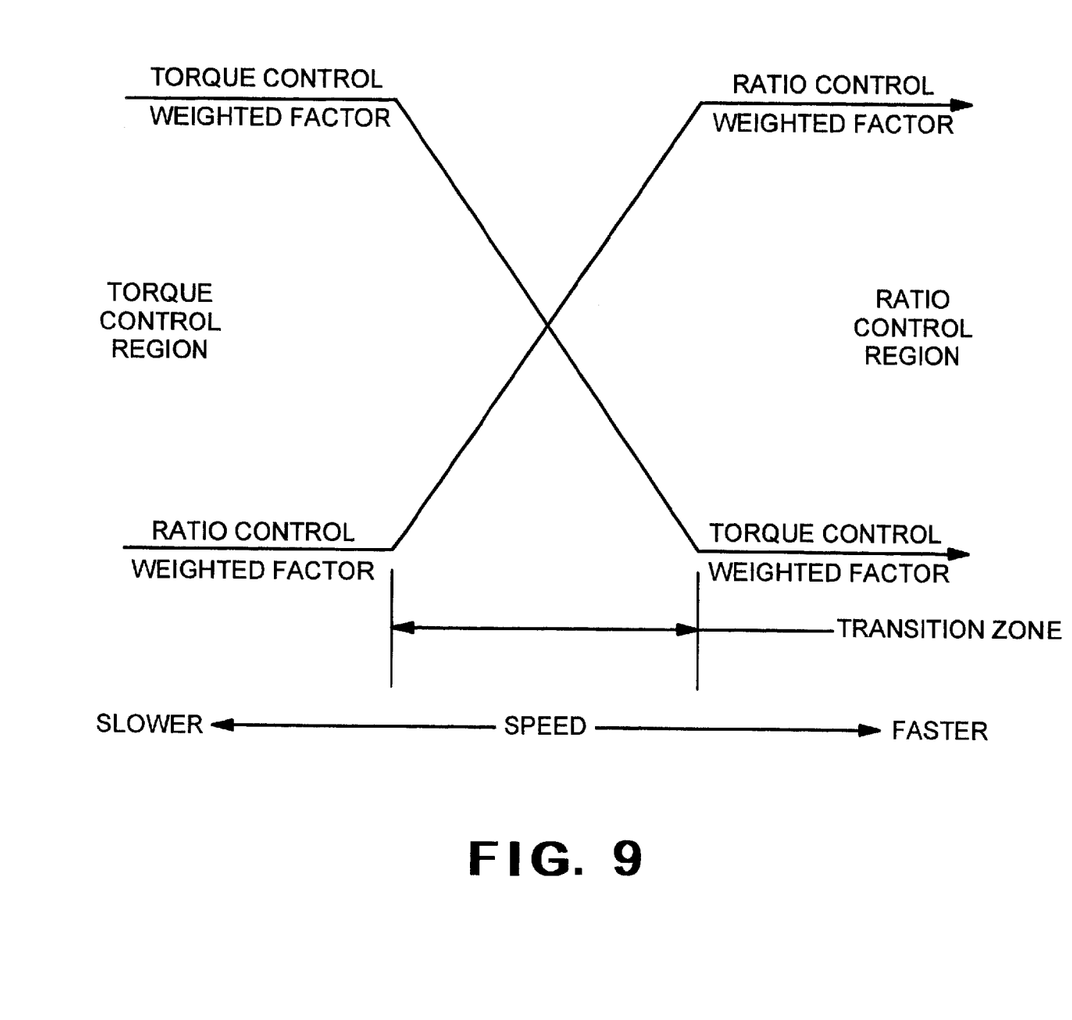
FIG. 9 is a chart illustrating the gradual transition from the torque control strategy to the ratio control strategy by assigning a weighted value to each of the calculated valve signals based upon the current operating conditions.

This method is illustrated graphically in the chart of FIG. 9. As shown therein, when the vehicle is operated at relatively low speeds, the torque control weighted factor is high. The magnitude of the influence of the calculated control valve setting based upon the torque control strategy can be determined by multiplying the calculated control valve setting based upon the torque control strategy by its associated torque control weighted factor. Because the torque control weighted factor is high at such low speeds, the influence of the calculated control valve setting based upon the torque control strategy is relatively large. Conversely, when the vehicle is operated at relatively low speeds, the ratio control weighted factor is low. The magnitude of the influence of the calculated control valve setting based upon the ratio control strategy can be determined by multiplying the calculated control valve setting based upon the ratio control strategy by its associated ratio control weighted factor. Because the ratio control weighted factor is low at such low speeds, the influence of the calculated control valve setting based upon the ratio control strategy is relatively small. Thus, during such low speed operation, the CVT 10 is essentially operated strictly in the torque control strategy.

On the other hand, when the vehicle is operated at relatively high speeds, the torque control weighted factor is low. Because the torque control weighted factor is low at such high speeds, the influence of the calculated control valve setting based upon the torque control strategy is relatively small. Conversely, when the vehicle is operated at relatively high speeds, the ratio control weighted factor is high. Because the ratio control weighted factor is high at such high speeds, the influence of the calculated control valve setting based upon the ratio control strategy is relatively large. Thus, during such high speed operation, the CVT 10 is essentially operated strictly in the ratio control strategy.

Between these two extremes, however, a transition zone is established, wherein the influence of the calculated control valve setting based upon the torque control strategy (i.e., the torque control weighted factor) is progressively decreased, while the influence of the calculated control valve setting based upon the ratio control strategy (i.e., the ratio control weighted factor) is progressively increased. Thus, the CVT 10 is operated in a blended torque/ratio control strategy during this transition, wherein the effective control valve setting is equal to the sum of (1) the calculated control valve setting based upon the torque control strategy multiplied by its associated torque control weighted factor and (2) the calculated control valve setting based upon the ratio control strategy multiplied by its associated ratio control weighted factor. The net result of this blended, weighted transition is further assurance of a smooth and transparent transition from the torque control strategy to the ratio control strategy.

The transition between the torque and ratio control strategies can occur at other desired points of operation beyond the mode point. For example, if the driver rapidly depresses the accelerator pedal while the vehicle is being operated at a relatively high, constant speed, the ratio control strategy would be effective to accelerate the vehicle as desired. However, it may be desirable under such circumstances to transition back to the torque control strategy to insure a smooth acceleration. As another example, if the CVT 10 becomes disconnected while the vehicle is in motion, such as might occur if both of the clutches 46 and 56 were simultaneously disengaged, the CVT 10 can be transitioned to ratio control strategy, even at low vehicle speeds, to match the rotational speed of the appropriate component within the CVT 10 with the rotational speed of the output shaft 57 as one or the other of the clutches 46 and 56 are engaged. This can prevent an undesirable transient torque from occurring during such engagement. An associated condition can occur at start-up of the vehicle when the gear selector is in park or neutral. In such a situation, the use of ratio control can insure that a transient torque is not generated when the gear selector is moved out of park or neutral to a ratio engaging position. The ratio control strategy may further be implemented to maintain the operation of the CVT 10 within certain safety limits.

Thus, the dual control strategy of the CVT 10 provides several advantages over either of the individual single control strategies. First, the dual control strategy provides for excellent low speed control and acceleration of the vehicle, particularly in the low ratios provided by the continuously variable drive section 20. Second, the dual control strategy achieves accurate speed management to facilitate the mode shift precisely at the mode point. Third, the dual control strategy results in superior engine management, such as by raising or lowering the engine speed to adjust for operating temperatures and to obtain optimum operating conditions. Fourth, the characteristic "feel" of a torque converter during launch of the vehicle from a stop can be replicated by increasing the differential pressure across the control piston 107a, resulting in a slight output torque against which the driver must brake. Lastly, the dual control strategy provides a measure of fault protection when unusual events occur.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A continuously variable transmission comprising:
   an input shaft;
   an output shaft;
   a continuously variable drive section connected between said input shaft and said output shaft, said continuously variable drive section including a roller that is mounted on a trunnion for movement therewith, wherein movement of said roller causes a change in a ratio provided by said continuously variable drive section between said input shaft and said output shaft;

first and second gear assemblies that are alternatively connected between said continuously variable drive section and said output shaft, wherein portions of said first and second gear assemblies rotate at a synchronous speed at a predetermined mode point; and a control system for selectively operating said continuously variable drive section in a torque control strategy under first predetermined operating conditions and in a ratio control strategy under second predetermined operating condition, said control system operating said continuously variable drive section in the torque control strategy when the rotational speed of said output shaft is less than the mode point, and operating said continuously variable drive section in the ratio control strategy when the rotational speed of said output shaft is greater than the mode point.

2. The continuously variable transmission defined in claim 1 wherein said control system operates said continuously variable drive section in the torque control strategy when the rotational speed of said output shaft is less than a predetermined value, and operates said continuously variable drive section in the ratio control strategy when the rotational speed of said output shaft is greater than a predetermined value.

3. The continuously variable transmission defined in claim 1 wherein said control system operates said continuously variable drive section in the torque control strategy when the rotational speed of said output shaft is less than the mode point, and operates said continuously variable drive section in the ratio control strategy when the rotational speed of said output shaft approaches the mode point.

4. A continuously variable transmission comprising:

an input shaft;

an output shaft;

a continuously variable drive section connected between said input shaft and said output shaft, said continuously variable drive section including a roller that is mounted on a trunnion for movement therewith, wherein movement of said roller causes a change in a ratio provided by said continuously variable drive section between said input shaft and said output shaft:

a control system for selectively operating said continuously variable drive section in a torque control strategy under first predetermined operating conditions and in a ratio control strategy under second predetermined operating conditions, wherein said control system gradually transitions from operating said continuously variable drive section in the torque control strategy to operating said continuously variable drive section in the ratio control strategy, and wherein said control system assigns a first weighted factor to the torque control strategy and a second weighted factor to the ratio control strategy.

5. The continuously variable transmission defined in claim 4 wherein said control system varies the first weighted factor and the second weighted factor to the ratio control strategy in response to the predetermined operating conditions.

* * * * *